(12) United States Patent
Park

(10) Patent No.: US 11,635,759 B2
(45) Date of Patent: Apr. 25, 2023

(54) METHOD OF MOVING ROBOT IN ADMINISTRATOR MODE AND ROBOT OF IMPLEMENTING METHOD

(71) Applicant: LG ELECTRONICS INC., Seoul (KR)

(72) Inventor: Hyeri Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 329 days.

(21) Appl. No.: 16/838,499

(22) Filed: Apr. 2, 2020

(65) Prior Publication Data

US 2021/0064035 A1 Mar. 4, 2021

(30) Foreign Application Priority Data

Aug. 30, 2019 (KR) .................. 10-2019-0107598

(51) Int. Cl.
*G05D 1/00* (2006.01)
*G05D 1/02* (2020.01)

(52) U.S. Cl.
CPC ......... *G05D 1/0088* (2013.01); *G05D 1/0214* (2013.01); *G05D 1/0223* (2013.01); *G05D 1/0231* (2013.01); *G05D 2201/02* (2013.01)

(58) Field of Classification Search
None
See application file for complete search history.

(56) References Cited

U.S. PATENT DOCUMENTS

| 2006/0229804 A1* | 10/2006 | Schmidt | G05D 1/0278 701/2 |
|---|---|---|---|
| 2010/0168934 A1* | 7/2010 | Ball | G05D 1/0242 701/2 |
| 2017/0050659 A1* | 2/2017 | Cardano | G05D 1/0088 |
| 2017/0108860 A1* | 4/2017 | Doane | G08G 1/16 |
| 2019/0008248 A1* | 1/2019 | Kovtun | G05D 1/0255 |
| 2019/0248014 A1* | 8/2019 | Deyle | B25J 13/006 |

FOREIGN PATENT DOCUMENTS

| KR | 20170089074 A | * | 8/2017 | |
| WO | WO-2018207908 A1 | * | 11/2018 | ............. B25J 13/00 |

OTHER PUBLICATIONS

Machine translation of KR 20170089074 A (Year: 2017).*
Machine translation of WO-2018207908-A1 (Year: 2018).*

* cited by examiner

*Primary Examiner* — Anne Marie Antonucci
*Assistant Examiner* — Kyle S Park
(74) *Attorney, Agent, or Firm* — Birch, Stewart, Kolasch & Birch, LLP

(57) ABSTRACT

A robot for moving in an administrator mode, can include a positioning sensor configured to sense a transmitter for calculating a position of the transmitter; an obstacle sensor configured to sense an obstacle around the robot; a driver configured to move the robot; and a controller configured to in response to receiving a signal from the transmitter, align the robot toward the position of a transmitter, move the robot toward the transmitter while avoiding one or more obstacles sensed by the obstacle sensor, and in response to no longer receiving the signal from the transmitter or a distance between the transmitter and the robot being equal to or less than a preset distance, stop the robot.

16 Claims, 12 Drawing Sheets

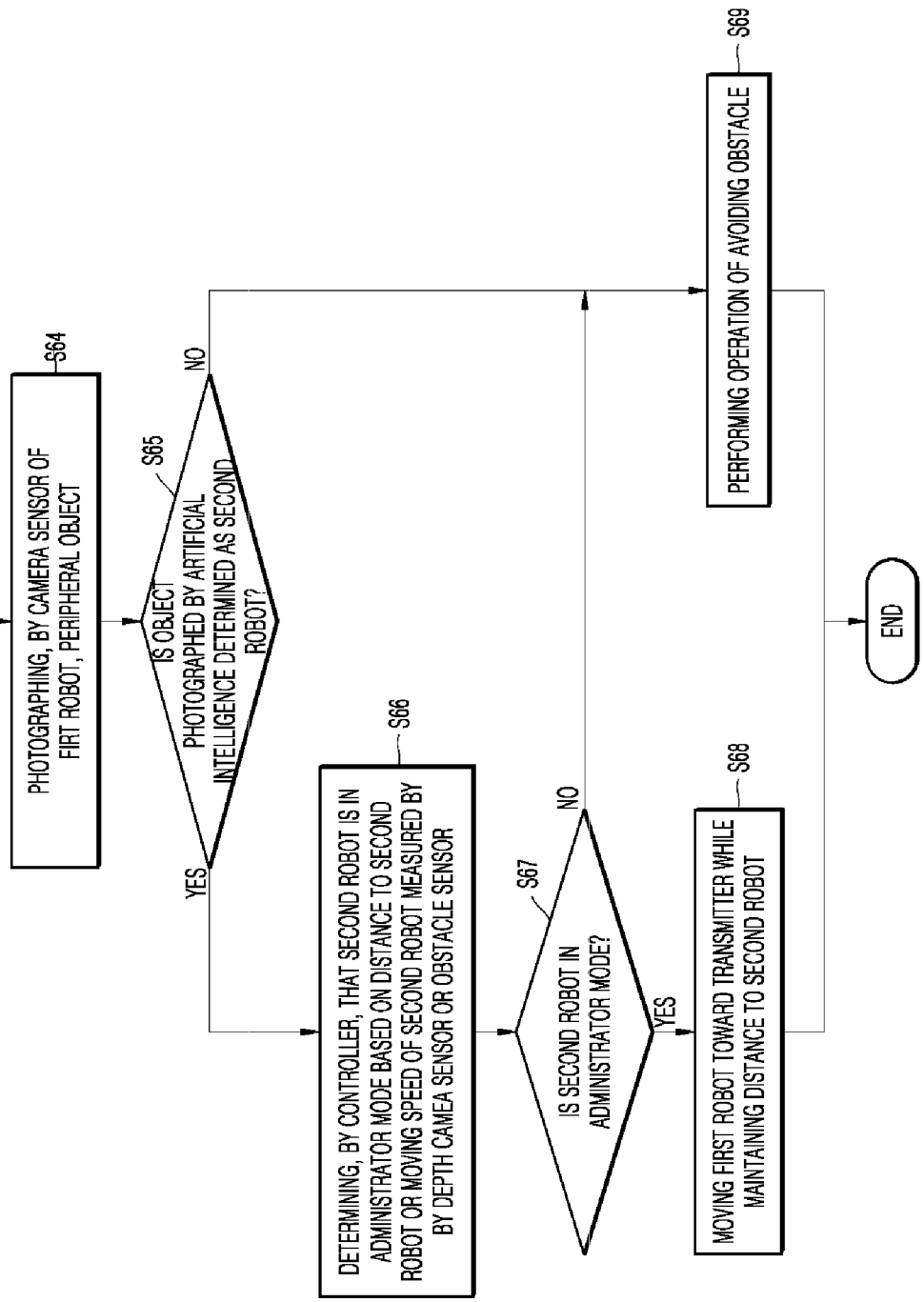

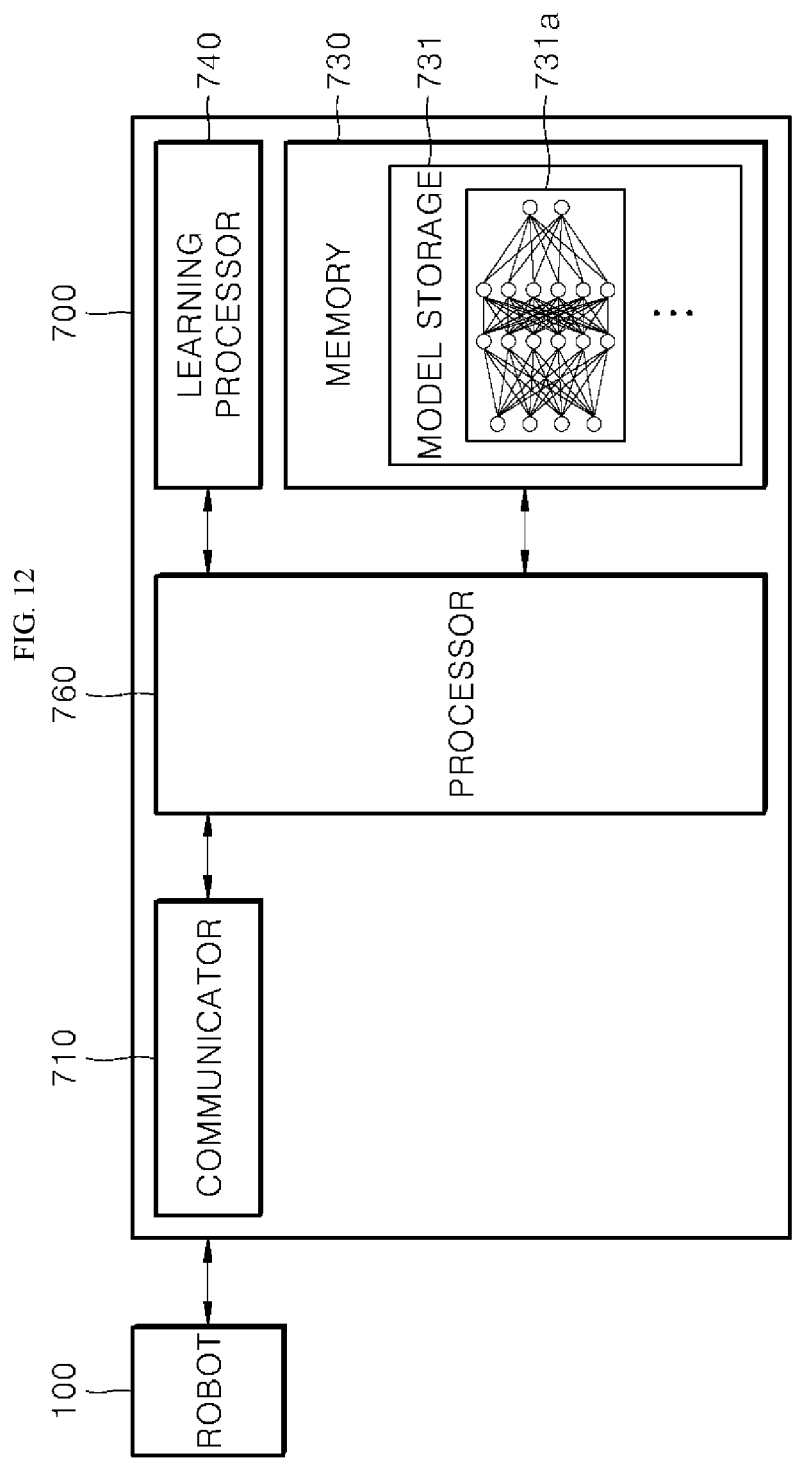

METHOD OF MOVING ROBOT IN ADMINISTRATOR MODE AND ROBOT OF IMPLEMENTING METHOD

CROSS-REFERENCE TO RELATED APPLICATION

This application claims priority to and the benefit of Korean Patent Application No. 10-2019-0107598, filed on Aug. 30, 2019, the disclosure of which is incorporated herein by reference in its entirety.

BACKGROUND

1. Field of the Invention

The present disclosure relates to a method of moving a robot in an administrator mode and a robot implementing such method.

2. Description of Related Art

In large spaces where human and material resources are exchanged, such as large marts, department stores, airports, and golf courses, various people may move while carrying various types of objects. In this situation, a robot, such as a cart (e.g., a cart-robot), may assist the user in moving the objects to provide user convenience.

In some examples, the robot may assist users in distribution centers, container centers, and the like or may automatically perform logistics delivery.

In related art, the users may move a robot directly or indirectly. However, there is an increasing need for a technology for moving under control of users based on electric power applied to the robot when various types of items being loaded into robots that deliver logistics or cart-robots that follow users or to move the robot having a weight of the robot.

In some examples, after the user uses the cart-robot, when the user leaves the cart-robot in a place and leaves that place, the cart-robot may not be used, and thus may wait for use by another user.

In this process, there is a need for a technology for easily moving, by an administrator, robots that load goods or assist a user, such as cart-robots or delivery robots, to a specific space or to easily align the robots.

Accordingly, the present disclosure suggests a method of automatically moving or operating carts so that a plurality of robots may move toward a specific place or may be aligned without applying additional physical force to the plurality of robots.

SUMMARY OF THE INVENTION

To solve the above-mentioned problems, the present disclosure proposes driving techniques of a robot so that the robot may easily move in an administrator mode.

In some examples, the present disclosure proposes a technique for detecting and avoiding obstacles so that the robot may move with a plurality of robots, in contrast to movement of the robot in a normal mode.

In some examples, the present disclosure proposes a technology for determining whether peripheral obstacles are robots during detection of peripheral obstacles when the robot moves in the administrator mode and for varying a moving speed or a moving direction of the robot.

The objects of the present disclosure are not limited to the above-mentioned objects, and the other objects and advantages of the present disclosure, which are not mentioned, may be understood by the following description, and more clearly understood by the embodiments of the present disclosure. It is also readily understood that the objects and the advantages of the present disclosure may be implemented by features described in appended claims and a combination thereof.

According to an embodiment of the present disclosure, a robot moving in an administrator mode may include a controller. The controller may align, when a signal is received from a transmitter, the robot itself toward a position of the transmitter calculated by a positioning sensor, may move the robot itself to the transmitter while avoiding obstacles sensed by an obstacle sensor, and may stop the robot itself based on the signal being not received from the transmitter and a distance between the transmitter and the robot being equal to or less than a preset distance.

According to an embodiment of the present disclosure, a method for moving a robot in an administrator mode may include sensing a transmitter by a positioning sensor of the robot to calculate a position of a transmitter, and aligning, by a controller of the robot, the robot toward a location of the transmitter, sensing, by an obstacle sensor of the robot, an obstacle disposed around the robot, moving, by the controller, toward the transmitter by avoiding the obstacle sensed by an obstacle sensor, and stopping, by the controller, the robot based on a signal being not received from the transmitter or a distance between the transmitter and the robot being equal to or less than a preset distance.

When embodiments of the present disclosure are applied, the robot may easily move without colliding with other obstacles or robots in the administrator mode.

When embodiments of the present disclosure are applied, it is possible to detect and avoid obstacles so that the robot may move with a plurality of robots, in contrast to the movement of the robot in the normal mode.

When embodiments of the present disclosure are applied, the robot may vary a moving speed or a moving direction of the robot based on determination whether peripheral obstacles are a robot in detecting an obstacle around the robot during moving in the administrator mode.

The effect of the present disclosure is not limited to the above-mentioned effect, and those skilled in the art of the present disclosure may easily understand various effects of the present disclosure based on the disclosure of the present disclosure.

BRIEF DESCRIPTION OF THE DRAWINGS

FIG. 11 shows an example process of determining whether peripheral objects are robots by photographing, by a camera sensor, peripheral objects according to an embodiment of the present disclosure.

FIG. 12 shows an example configuration of an artificial intelligence (AI) server according to an embodiment of the present disclosure.

DETAILED DESCRIPTION OF THE EMBODIMENTS

Figure 1:
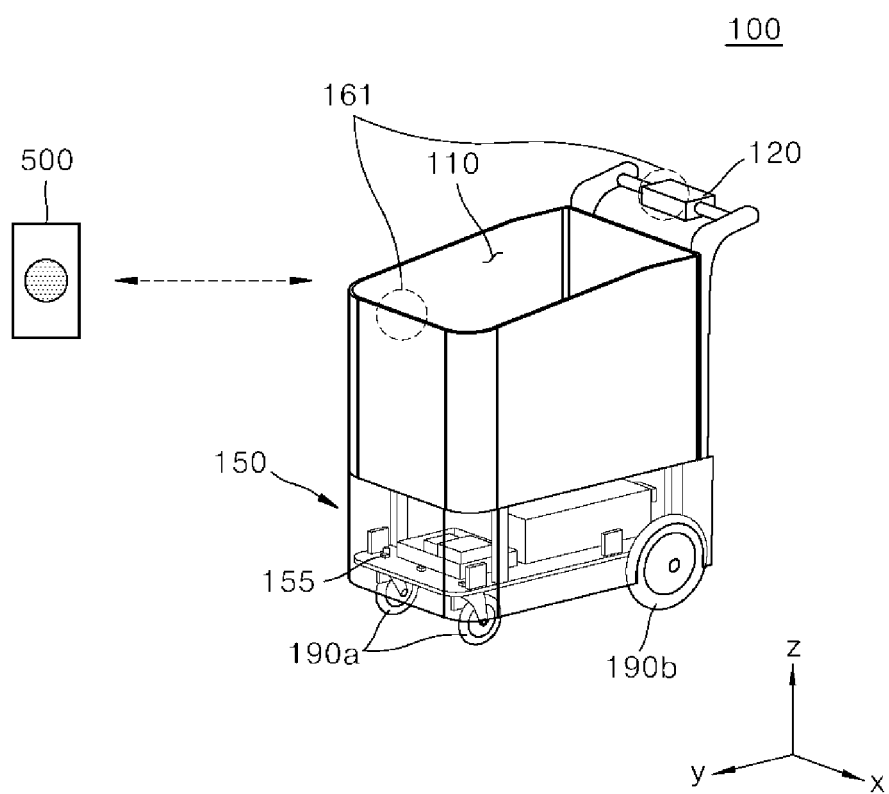
FIG. 1 shows example appearance of a robot according to an embodiment of the present disclosure.

Hereinafter, example embodiments of the present disclosure will be described in detail with reference to the accompanying drawings so that they can be easily practiced by those skilled in the art. The present disclosure may be embodied in many different manners and should not be construed as being limited to the embodiments set forth herein.

In some examples, portions irrelevant to the description of the present disclosure will be omitted for clarity. Moreover, same or similar elements are designated by a same reference numeral throughout the present disclosure. Also, some embodiments of the present disclosure will be described in detail with reference to the accompanying drawings. In adding reference numerals to elements in each figure, it should be noted the same elements will be designated by the same reference numerals, if possible, even though they are shown in different drawings. Further, in the following description of the present disclosure, a detailed description of known functions or configurations incorporated herein will be omitted when it is determined that the description may make the subject matter of the present disclosure rather unclear.

In some examples, terms such as first, second, A, B, (a), (b) and the like may be used herein when describing the elements of the present disclosure. These terms are intended to distinguish one element from other elements, and the essence, order, sequence, or number of corresponding elements is not limited by these terms. It should be understood that when any one element is described as being "connected," "combined," or "coupled" to another element, they may be connected, combined, or coupled to each other directly or with an intervening element therebetween.

Further, one element may be described as its sub-elements in implementing the present disclosure; however, the sub-elements may be implemented in a single device or module in an integrated manner or implemented in multiple devices or modules in a distributed manner.

Hereinafter, devices that follow the user and move autonomously or move based on electrical energy under the control of the user are referred to as "a smart cart-robot," "a cart-robot," "a delivery robot" or "robot." The robot may be used in stores, such as large marts and department stores. Alternatively, users may use the robot in a space where many travelers move, such as airports or harbors. Robots may also be used in leisure spaces such as golf courses.

In some examples, the robot may move automatically while goods are loaded onto the robot or may move under the control of the user in container logistics centers or factories. Alternatively, the robot may transport patients or drugs in spaces such as hospitals.

According to the present disclosure, the robot may refer to a machine that automatically processes or operates a given work with capability of the robot. In particular, a robot that performs a function for recognizing environment, determining the state by itself, and operating operation of the robot may be referred to as "an intelligence robot."

Robots may be classified into industrial robots, medical robots, household robots, military robots, and the like, according to purpose or field of use.

The robot can include a driver. The driver includes an actuator or a motor to perform various types of physical operations, such as moving a robot joint. In some examples, the movable robot includes the driver and the driver includes a wheel, a brake, a propeller, and the like, and can travel on the ground or fly in the air using the driver.

In some examples, the robot can include a predetermined accommodator and can move while following the user.

The robot can also perform autonomous driving. Autonomous driving refers to a self-driving technology, and the autonomous robot travels without user's manipulation or with minimum level of manipulation of the user.

For example, autonomous driving can include technology for maintaining a distance to other obstacles in a driving space of the robot, technology for automatically adjusting a speed of the robot such as adaptive cruise control, technology for automatically travelling along a predetermined path of a robot, and technology for automatically setting a route of the robot when a destination of the robot is set.

The robot can include an internal combustion engine or an electric motor for autonomous driving.

In an example embodiment, the robot includes all types of apparatuses that track position of the user to follow the user having a predetermined storage space. The storage space can load things, or a human can ride on the storage space for a moment. Further, the robot includes all types of devices that move based on the electric power under the control of a user, for example, pushing or pulling. As a result, the user can move the robot without controlling the robot. The user can also move the robot with a small magnitude of force.

In particular, in the present disclosure, the robot moves based on the electrical power under on the control of the user. The robot can analyze the force controlled by the user to adjust the moving speed and the moving direction of the cart or can perform a function for moving and stopping the robot.

In some examples, in the present disclosure, the robot can move or align along pre-appointed administrator tags in a predetermined administrator mode. In this situation, the administrator mode is a mode in which two or more robots move while following one transmitter to move two or more robots to a specific position. As a plurality of robots move toward the transmitter in the administrator mode, a process of detecting and avoiding obstacles in the administrator mode is different from a process of detecting and avoiding obstacles in a normal mode.

Figure 2:
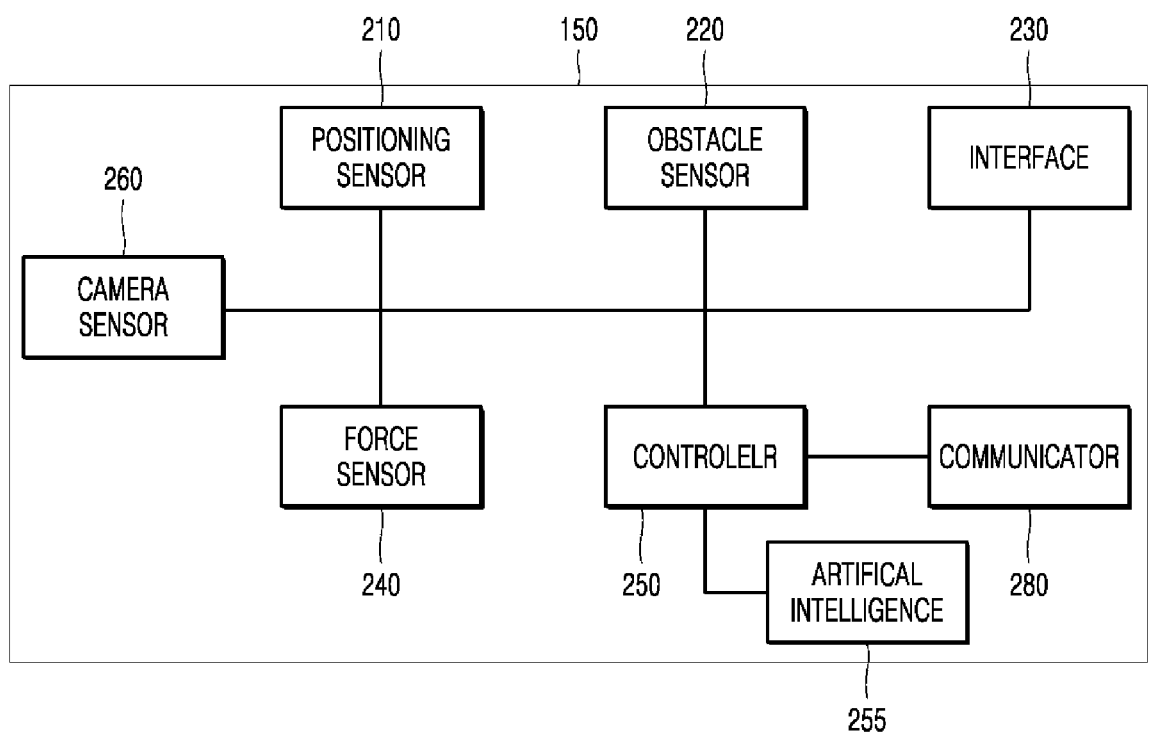
FIG. 2 shows an example configuration of a controller of a robot in detail according to an embodiment of the present disclosure.

FIG. 1 shows example appearance of a robot. FIG. 2 shows an example configuration of a controller 120 of a robot in detail.

As an example of a robot that defines a space for accommodating objects include a robot having a cart shape as shown in FIG. 1. However, the present disclosure is not limited thereto. According to the embodiments of the present disclosure, examples of the robot include a robot that defines an accommodating space where large goods are loaded, or defines a space having a bed shape and where patients are transported in hospitals. In some examples, various types of robots that load and transport goods in container logistics centers are also included in embodiments of the present disclosure. A robot 100 includes a storage 110, a handle assembly 120, a control portion 150, and drivers 190a and 190b. The object is stored or loaded, by the user, in the storage 110. The handle assembly 120 enables a user to manually control the movement of the robot 100 or to semi-automatically control the movement of the robot 100.

The handle assembly 120 is disposed on one surface of the robot and senses, when the user applies the force during controlling of the robot 100, the force applied by the user. The control portion 150 controls the movement of the robot 100. The control portion 150 determines a direction, speed, and the like of movement of the robot and moves a driver 190, based on the force sensed by the handle assembly 120. Accordingly, the user can push the robot 100 forward and rearward or can change the direction of the robot 100 using the handle assembly 120. The control portion 150 controls the movement of the robot 100.

The control portion 150 controls the autonomous travelling of the robot 100 to follow the user, using a transmitter 500, in the autonomous mode. Further, the control portion 150 assists the user in pushing or pulling the robot with a small magnitude of force in the power assist mode to control semi-autonomous travelling (the power assist) in which the robot travels.

Therefore, when the user applies the force to the handle assembly 120 to control the robot, a force sensor 240 senses the force applied to the handle assembly 120. The force sensor 240 can sense a magnitude of force applied to the handle assembly 120 or changes in the forces in a time of unit. The force sensor 240 is disposed in the handle assembly 120. A controller 250 of the control portion 150 determines a magnitude, a direction of the force, and an increasing speed of the force sensed by the force sensor 240. That is, the force sensor 240 is physically disposed in the handle assembly 120 and logically interacts with the controller 250 of the control portion 150.

The handle assembly 120 can include an interface that outputs predetermined information to the user. The interface 230 can also be controlled by the control portion 150. The interface 230 can show the user a method for controlling the robot 100 and the handle assembly 120. Alternatively, the interface 230 can output a warning message to the user during controlling of the robot 100 and the handle assembly 120.

An obstacle sensor 220 that senses an obstacle provided around the robot can be provided in a particular area of the robot 100. The obstacle sensor 220 can be provided in various areas, such as an upper end, a lower end, and the like of the robot 100. For example, a plurality of obstacle sensors 220 can be provided in an area indicated by reference numeral 155 to sense obstacles placed at a front side, a rear side, a left side, and a right side, of the cart.

In an embodiment, the obstacle sensor can be placed on the front surface/both lateral surfaces of the robot in a direction where the robot 100 moves. Alternatively, when the robot 100 moves rearward, the obstacle sensor can be placed on a front surface, a rear surface, and both sides of the robot.

Further, a positioning sensor 210 that tracks a position of a user to follow a user can be disposed in various areas of the robot 100. The positioning sensor 210 can detect the transmitter 500 that outputs a specific signal.

That is, the robot 100 can be remotely disposed to identify a position of a predetermined transmitter 500 possessed by users or administrators, to move while following users or can move or can be aligned according to instructions of the administrator.

The driver 190 moves the robot based on control of the controller. Further, the driver 190 can move the robot along a predetermined path formed by the controller 250. The controller 250 can determine a state in which the robot 100 moves via movement of the driver 190 based on speed of rotation of wheels, the number of rotation of wheels, a direction of rotation of wheels, and the like. The driver 190 can include a predetermined brake, and the controller 250 can control the brake of the driver 190 to stop a moving robot 100.

In addition, the controller 250 can check the level or horizontality of the wheels that are included in the driver 190 and can identify whether the robot 100 is on a slope or on a flatland. In another embodiment, the controller 250 can identify whether the robot is on a slope or on the flatland, using a horizontality sensor.

The force sensor 240 is placed in the handle assembly 120 and senses, when the user applies the force to the handle assembly 120, a magnitude of the force or changes in the force applied by the user.

The force sensor 240 includes various types of sensors, for example, a hall sensor, a magnetic-type sensor, and a button-type sensor.

The control portion 150 can control the drivers 190a and 190b. The driver 190 moves the robot along the moving path formed by the controller 250. The driver 190 can move the robot 100 by rotating the wheels included in the driver 190. The controller 250 can identify the position of the robot 100 based on a rotating speed and a number of rotations, and a direction, of the wheel, through the movement of the robot by the driver 190. An angular speed applied to a left wheel and a right wheel of the robot is provided, in the moving path formed by the controller 250.

As shown in FIG. 2, the control portion 150 includes logical components, for example, the positioning sensor 210, the force sensor 240, the obstacle sensor 220, the interface 230, the controller 250, the camera sensor 260, and a communicator 280.

The obstacle sensor 220 senses an obstacle provided near the robot. The obstacle sensor 220 can sense a distance between the robot and a person, a wall, an object, a fixed object, an installed object, and the like.

The positioning sensor 210 of the robot supports autonomous traveling. However, in a robot that supports only semi-autonomous traveling (power assist), the positioning sensor 210 can be selectively disposed.

The positioning sensor 210 senses a signal transmitted by the transmitter 500 and calculates a position of the transmitter. The positioning sensor 210 can track the location of a user or an administrator who carries the transmitter 500 and can be disposed at an upper end or a side of the robot 100. However, the positions of these sensors can change in various manners and the present disclosure is not limited thereto. Regardless of the positions of the sensors, the control portion 150 controls the sensors or uses information sensed by the sensors. That is, the sensors are logical elements of the control portion 150 regardless of the physical positions of the sensors.

The positioning sensor 210 receives a signal from the transmitter 500 and measures the position of the transmitter 500. When the positioning sensor 210 uses ultra-wideband (UWB), a user/administrator can carry a transmitter 500 that transmits a predetermined signal to the positioning sensor 210. The positioning sensor 210 can identify the position of the user based on the position of the transmitter 500. For example, the user can carry a transmitter 500 having a form of a band worn on a wrist. Alternatively, the transmitter 500 held by the administrator can output a high-intensity signal to transmit a signal to robots which are far away from the transmitter 500.

An interface that outputs predetermined information to a user can also be disposed in the handle assembly 120, and the interface is controlled by the control portion 150. The handle assembly 120 includes the force sensor 240 that senses a force with which a user pushes or pulls the robot.

The force sensor 240 can be disposed inside or outside of the robot 100 which is subjected to change of a force by operation of the handle assembly 120. The position or configuration of the force sensor 240 is not particularly limited, and the embodiment of the present disclosure is not limited to any specific force sensor 240.

The force sensor 240 is disposed in the handle assembly 120 or is disposed inside or outside of the robot 100 connected to the handle assembly 120. When a user applies a force to the handle assembly 120, the force sensor 240 senses the magnitude of a force, change of a force, and the like. The force sensor 240 includes various types of sensors such as a Hall sensor, a magnetic type sensor, and a button type sensor. The force sensor 240 can include a left force sensor and a right force sensor and the left force sensor and the right force sensor can be disposed inside or outside of the handle assembly 120 or the robot 100, respectively.

The obstacle sensor 220 senses an obstacle near the robot. The obstacle sensor includes a sensor that measures a distance or acquires an image and identifies an obstacle in the image. Examples of the obstacle sensor 220 that measures the distance include an infrared sensor, an ultrasonic sensor, and a LiDAR sensor.

Further, the obstacle sensor 220 includes a depth sensor or an RGB sensor. The RGB sensor can sense an obstacle and an installed object in an image. The depth sensor can generate depth information for each position in an image.

In some examples, the obstacle sensor 220 includes a time-of-flight (TOF) sensor.

The controller 250 cumulatively stores position information of a transmitter 500 and generates a moving route corresponding to the stored position information of the transmitter. In order to cumulatively store the position information, the controller 250 can store the position information of the transmitter 500 and the robot 100 as information on absolute position (absolute coordinates) based on a predetermined reference point.

Alternatively, the controller 250 can control movement of the robot using the obstacle sensor 220 and the camera sensor 260. Particularly, the camera sensor 260 can be disposed in an area indicated by reference numeral 161 in FIG. 1, and can photograph the user or the storage 110.

Alternatively, the camera sensor 260 can be disposed at a position indicated by reference numeral 161 to photograph other peripheral obstacles.

In some examples, the controller 250 controls the moving direction or the moving speed of the driver based on the change or magnitude of a force sensed by the force sensor 240. Alternatively, the controller 250 can control the driver 190 such that a lot of magnitude of electric energy is supplied to a motor of the driver to control the moving speed of the driver.

In some examples, the controller 250 detects the installed object near the robot using a value sensed by the obstacle sensor 220. The controller 250 can determine an installed object using the obstacle sensor 220 disposed at lateral side and a front side of the robot.

In some examples, the controller 250 of the robot 100 can additionally mount the artificial intelligence 255. An embodiment of the artificial intelligence can be machine learning or deep learning network.

The controller 250 of the robot can perform context awareness using the artificial intelligence. Similarly, the controller 250 can determine the situation of the robot 100 based on the sensed values, the control of the user, or information received from other robots or the server, as input values of the artificial intelligence.

Further, the controller 250 of the robot 100 provides a function for voice recognition and a text-to-speech (TTS).

In addition, the robot 100 can include a battery that supplies power to the driver 190, the handle assembly 120, and the control portion 150. The battery provides the force that the driver 190 moves the robot, by the control portion 150.

The force that the user pushes the robot is similar to the force that may not move the robot in the absence of electric force or the force that moves the robot at very slow speed. However, in embodiments of the present disclosure, the controller 250 can map a speed or a direction of movement of the robot with respect to the force that the user pushes the robot, in power-assist mode. Accordingly, the user can move the robot with a small magnitude of force.

According to an embodiment of the present disclosure, the controller 250 controls the robot so that the robot follows the transmitter without colliding with other robots when a plurality of robots follow a transmitter and move in the administrator mode. To this end, when the positioning sensor 210 receives a signal from the transmitter 500, the controller 250 aligns the robot toward the position of the transmitter 500 calculated by the positioning sensor 210. The robot is moved toward the transmitter 500 while avoiding the obstacles sensed by the obstacle sensor 220.

In some examples, the controller 250 controls the robot 100 to be stopped based on a signal of the transmitter 500 being not received or a distance between the transmitter 500 and the robot 100 being equal to or less than a preset distance. In this process, the controller 250 can control the moving speed and the moving direction of the robot by distinguishing a plurality of robots toward the transmitter from obstacles rather than robots (or robots not in the administrator mode).

A process of moving the robot while following a specific administrator transmitter 500 and aligning in the administrator mode of the robot is described below.

As illustrated in FIGS. 1 and 2, the robot 100 can be disposed at various kinds of positions after being used by a plurality of users in a space. Accordingly, there is a need for a technique in which the robots follow the administrator transmitter 500 to be in the administrator mode to move or align the robots.

In one embodiment, when a robot, such as a cart, is used, it may be difficult for an administrator to move all these cart-robots at the same time when the cart-robots are not docked with and connected to each other.

In some examples, when the robot in charge of delivery or logistics is disposed in various types of areas in the factory after the robot completes logistics works, it may be difficult for the administrator to control the logistics robots at once.

Hereinafter, when a plurality of robots are in a standby state without additional work, or when the robots are needed to be urgently managed, these robots can switch to the administrator mode of the robot in which the robots can move following the transmitter 500 of the administrator and operation of the robot in the administrator mode, and the switch and the operation are described.

In one embodiment, when, after the user completes using the cart-robot that can follow the tag, and the user disposed a customer transmitter (e.g., the tag) in a storage of the robot or an additional storage of the robot, the mode of the robot is switched to the administrator mode.

Alternatively, when the autonomous moving logistics robot completes logistics delivery or transporting operation, the robot waits for performance of the next operation at a point where the operation of the robot is completed or in a specific place.

Then, when the robots are lined up in a storage or an empty space of the mart, the administrator moves a foremost robot using the administrator's transmitter, and the robots lined up behind the foremost robot can move based on information provided by the administrator's transmitter 500 carried by the administrator.

At this time, as the robots are lined up, at least one robot behind the foremost robot can recognize the robot in front using the obstacle sensor, and can adjust a speed of the robot to maintain a predetermined distance and follows the robot in front.

In such a configuration, robots in a standby state or in need of urgent management in a space can follow an administrator's transmitter and simultaneously move and control a plurality of robots through a single transmitter.

In some examples, a robot can move under the control of the transmitter 500 while preventing collision with other robots using the obstacle sensor 220 or the camera sensor 260 in the process of following the transmitter. As a result, the administrator simply controls the robots using the transmitter 500, and the robots can follow the transmitter 500 and can move while avoiding collision with obstacles in the administrator mode.

In some examples, in an embodiment, when the camera sensor 260 is a depth camera that photographs a depth image, the artificial intelligence 255 can perform image analysis based on the photographed depth image. The above configuration is described below.

According to the present disclosure, the robot provides a function for following a transmitter that transmits a signal. The transmitter includes the above-described customer transmitter and administrator transmitter. Alternatively, when the transmitter is the administrator transmitter, examples of the transmitter can include a carrying transmitter that can be carried by a person or a fixed transmitter attached to objects.

The carrying transmitter has a form of a wrist band, a tag, and the like, and can be easily carried by a person. The fixed transmitter is disposed on the wall or the ceiling to maintain an off-state normally, and to switch to on-state in a specific management state, and the transmitter can control the robots in the space.

Figure 3:
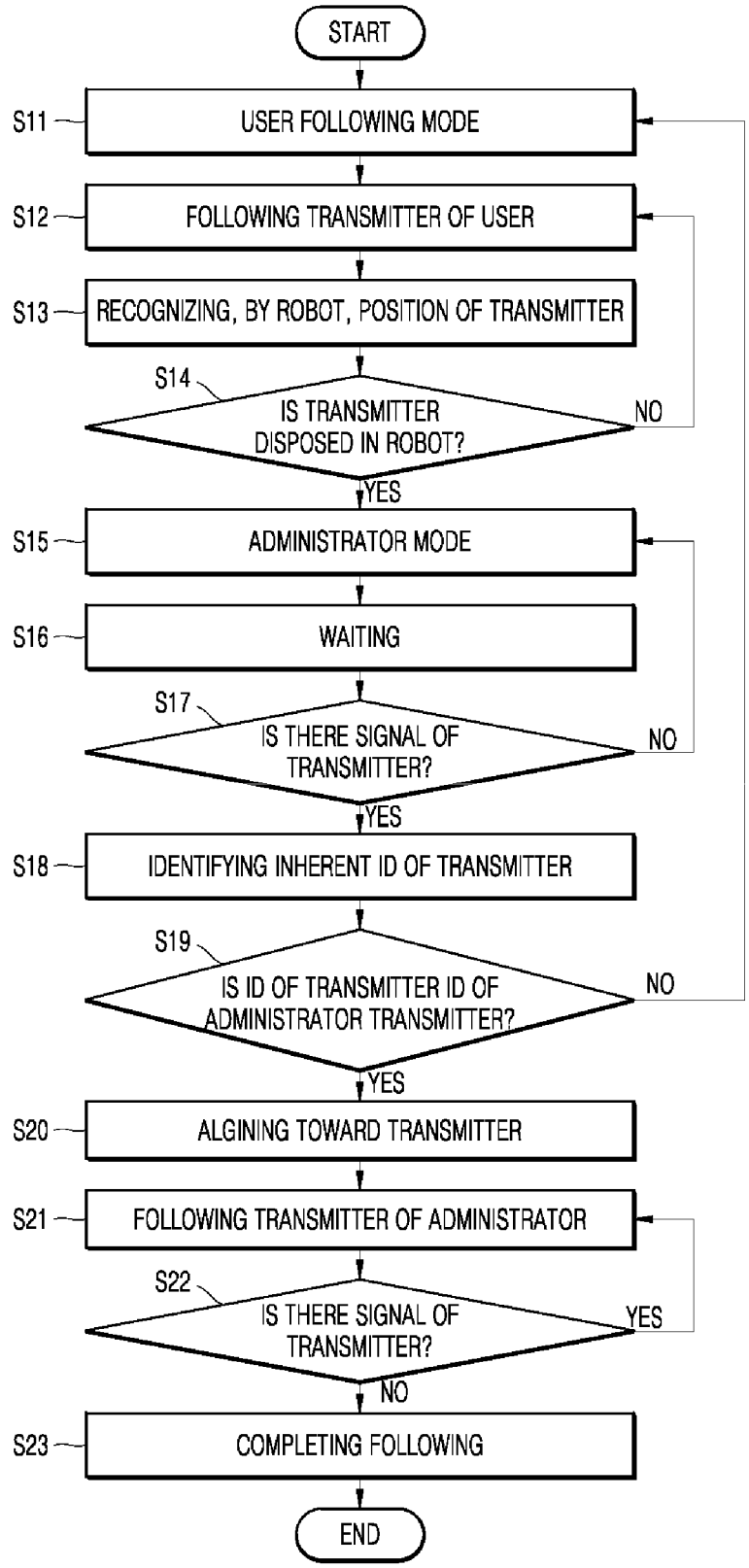
FIG. 3 shows an example operation process of a robot in a user following mode and an administrator mode according to an embodiment of the present disclosure.

FIG. 3 shows an example operation process of a robot in a user following mode and an administrator mode.

The robot performs a user following mode (S11). The robot travels along a customer transmitter carried by the user. The robot follows the transmitter of the user and moves along a position of the transmitter (S12).

In the situation of the logistics robot or the delivery robot, processes of S11 and S12 can be replaced with a process of travelling under additional external control or along a pre-programmed route.

The robot determines whether the transmitter is disposed in the robot in the process of continuously recognizing of the position of the transmitter (S14). The transmitter disposed in the robot refers that the transmitter is disposed in a storage 110 or the transmitter is disposed in a specific area of the robot. The robot determines that the robot may not be required to perform the user following mode in which the robot follows the transmitter and can enter the administrator mode (S15). In other situations, the robot continually performs the user following mode.

In the situation of robots other than cart-robots, such as logistics robots, hospital robots, cleaning robots, or delivery robots, processes of S13 to S15 can be replaced with a process of performing additional external control or completing pre-programmed operation or entering the robot in the administrator mode forcibly based on additional external signal.

The robot that enters the administrator mode waits (S16). Additional instruction of the administrator transmitter can be provided or new user controls the transmitter in the situation of the cart-robot, or other robots can wait until new operation is assigned.

The robot determines whether there is a signal of the transmitter (S17). The robot identifies an identifier (ID) of the transmitter (S18). Based on determination that the ID of the transmitter is an ID of the administrator transmitter (S19), the robots are aligned toward the transmitter in the administrator mode (S20). The robot moves while following the transmitter of the administrator (S21).

Alignment process (S20) can be repeated. After the robot avoids the obstacle during moving of the robot, the robot can be aligned again so that the robot moves toward the transmitter.

The robot continuously checks the signal of the transmitter during following of the administrator transmitter in the administrator mode (S22). Based on determination that the signal is not provided by the transmitter, the robot ends following the transmitter (S23). The robot can continually follow the administrator transmitter when signal of the transmitter continues.

The process of FIG. 3 is summarized as follows. The cart-robot has a "user following mode" in which the cart-robot travels with following the user and an "administrator mode (a standby mode)" in which the robot waits for the next user after following the user. Robots such as logistics robots/cleaning robots/hospital robots/delivery robots other than the cart-robot have a "work mode" in which the robot performs the operation and "an administrator mode (a standby mode)" in which the robot finishes the operation and waits for the next operation.

In the user following mode, the user carries a transmitter paired with the cart-robot, and the cart-robot moves while following the transmitter carried by the user. Robots other than the cart-robots perform previously ordered work.

In administrator mode, the robot starts following the administrator transmitter. For example, in the situation of the cart-robot, the user can finish using the cart and dispose the customer transmitter at a designated position of the cart or in the cart, or the user can turn off the customer transmitter.

After performing the above-described process, the administrator transmitter is turned on. Alternatively, the administrator transmitter is turned on when the robot that has completed the operation waits.

At this time, the robots which are lined up or disposed in various positions in the space can simultaneously start following the transmitter in the administrator mode. The administrator can press an additional control button disposed in the administrator transmitter to instruct alignment of all of the robots for easy following of the plurality of robots.

All the robots travel while following the administrator transmitter carried by the administrator. At this time, the robot recognizes a distance between itself and the robots disposed around itself using the obstacle sensor or the camera sensor, maintains the distance between itself and at least one or more other robots disposed around itself, and follows the transmitter in the administrator mode.

In an embodiment, each robot can determine a distance to the robots arranged in all directions to avoid collisions and follow the administrator transmitter.

In one embodiment, each of the robots can distinguish the robots arranged in all directions from other obstacles and can recognize the robots using a depth camera as an example of the camera sensor, can avoid collisions with the robots, and can follow the administrator transmitter.

Figure 4:
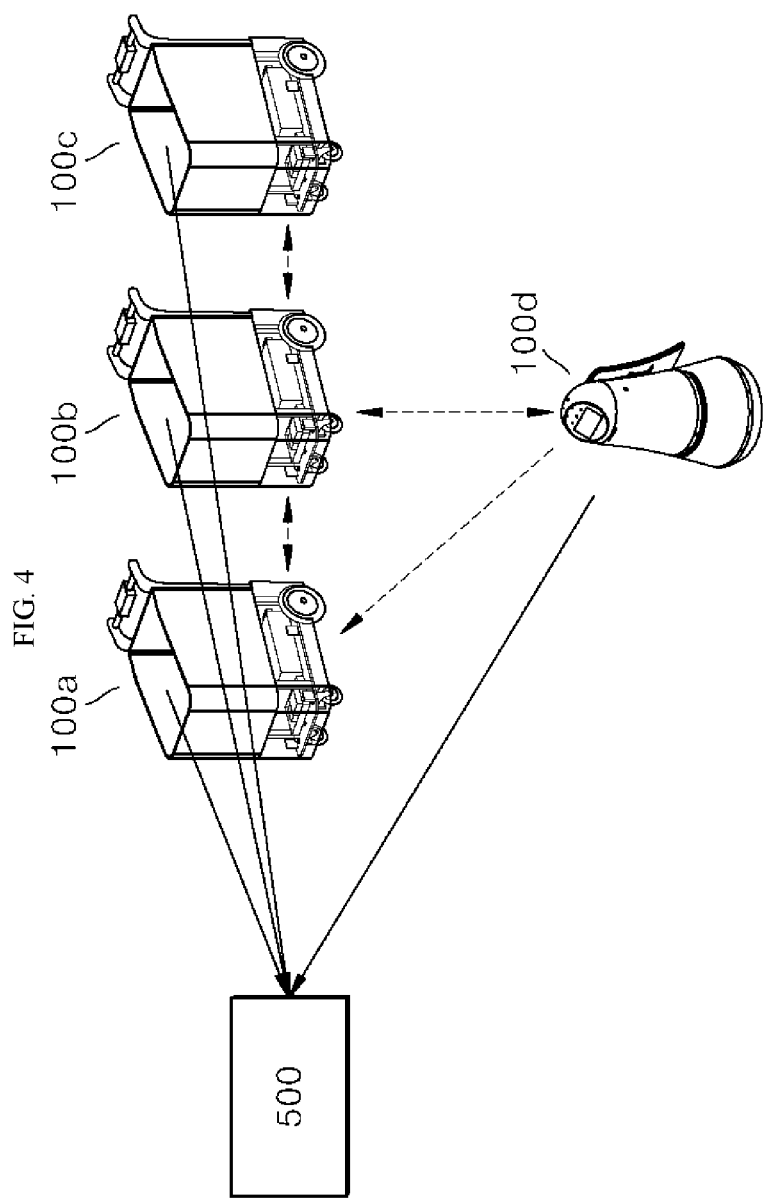
FIG. 4 shows an example process of following, by a robot, an administrator transmitter according to an embodiment of the present disclosure.

FIG. 4 shows an example process of following, by a robot, an administrator transmitter. A plurality of robots 100a, 100b, 100c, and 100d track the position of the transmitter 500 when these robots 100a, 100b, 100c, and 100d detect the signal of the transmitter 500. Reference numerals 100a, 100b, and 100c illustrate cart-robots in brief and reference numeral 100d illustrates a non-cart robot in brief. The robots move toward the detected transmitter 500.

In this situation, at least one robot among the robots 100a, 100b, 100c, and 100d can maintain a distance from each of the robots 100a, 100b, 100c, and 100d indicated by dashed lines using sensors. For example, the controller 250 can control moves 190a and 190b of the robot so that at least one robot among the robots 100a, 100b, 100c, and 100d maintain a distance to each of adjacent robots using the obstacle sensor 220, such as the ToF sensor and the ultrasonic sensor, and moves while following the transmitter 500.

In some examples, the robot in which the camera sensor 260, in particular, a depth camera is mounted can distinguish the obstacle from the adjacent robot and determine whether the object is the obstacle or the adjacent robot. Therefore, the controller 250 can set a distance (Dist_obj) between an obstacle and a robot and a distance (Dist_robot) between two robots of the robots differently.

In an embodiment, the controller 250 can move the robot based on condition of Dist_obj>Dist_robot being satisfied. In the administrator mode, maintaining a very close distance between two robots of the robots that move along the administrator transmitter 500 is advantageous for efficient movement of the robot.

Figure 5:
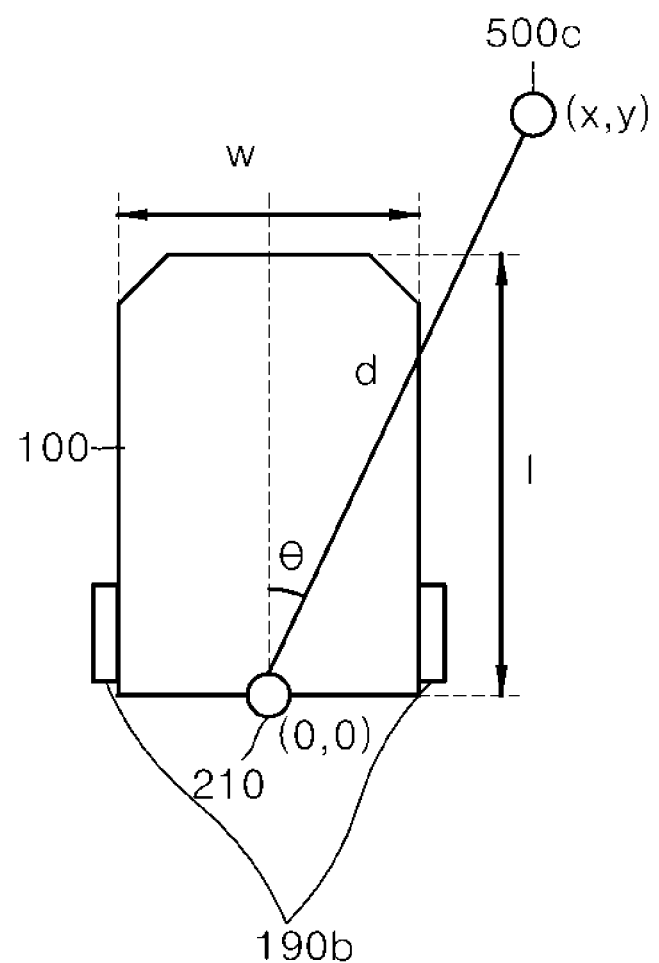
FIG. 5 shows an example process of identifying, by a robot, a position of a customer transmitter according to an embodiment of the present disclosure.

FIG. 5 shows an example process of identifying, by a robot, a position of a customer transmitter. The process is applied when a user controls the robot or moves the robot using the transmitter, or the robot moves while following the transmitter when the user carries the transmitter.

The robot can determine that the user following mode has ended when the user places the transmitter in a specific accommodating area of the robot. To this end, the robot determines the distance between the transmitter and the robot.

In an embodiment, as shown in FIG. 5, if a positioning sensor 210 of a robot 100 is set to a position of (0, 0), a coordinate (x, y) of the position of the customer transmitter 500c is calculated as shown in Equation 1.

$$(x,y)=(d\cdot\sin\theta, d\cdot\cos\theta) \quad \text{[Equation 1]}$$

When a position coordinate of (x, y) of the transmitter satisfies following Equation 2, a controller 250 determines that a customer transmitter 500c is disposed at a specific position of the robot.

$$-\frac{w}{2} < d\cdot\sin\theta < \frac{w}{2} \quad \text{[Equation 2]}$$
$$0 < d\cdot\cos\theta < l$$

The variable "w" is a width of the robot. The variable "l" is a length of a robot. The variable "d" is a distance between a positioning sensor 210 and a transmitter 500c. The variable "θ" is an angle between a centerline of a robot and a line connecting a transmitter 500c and a positioning sensor 210. In the present disclosure, angle θ is referred to as "a centerline angle."

The centerline of the robot refers to a virtual line disposed at a center of the robot.

Width w, length l, distance d, and angle θ in FIG. 5 are used to identify the position of the administrator transmitter.

FIG. 5 is summarized as follows. The robot receives signals from two types of transmitters. A first transmitter controls the robot in the administrator mode. A second transmitter controls the robot in the user following mode.

When both the first transmitter and the second transmitter transmit a signal, the controller 250 can determine the priority of each of the two transmitters. For example, in an emergency administrator mode, the controller 250 follows the signal of the first transmitter to move the robot. In the general administrator mode, the controller 250 follows a signal of the second transmitter in the user following mode to move the robot.

In some examples, if the signal is not detected from the second transmitter in the user following mode or the second transmitter is determined to be disposed inside the robot, the controller 250 switches the mode of the robot into an administrator mode to control the robot to move while following the first transmitter based on the signal of the first transmitter.

In some examples, in order for the robot to determine whether the second transmitter is disposed in the robot, as illustrated in FIG. 5, the controller 250 determines a size of the robot, and calculates a position of the positioning sensor 210 of the sensor, and a position of the second transmitter 500c to determine that the second transmitter 500c is disposed inside the robot.

Figure 6:
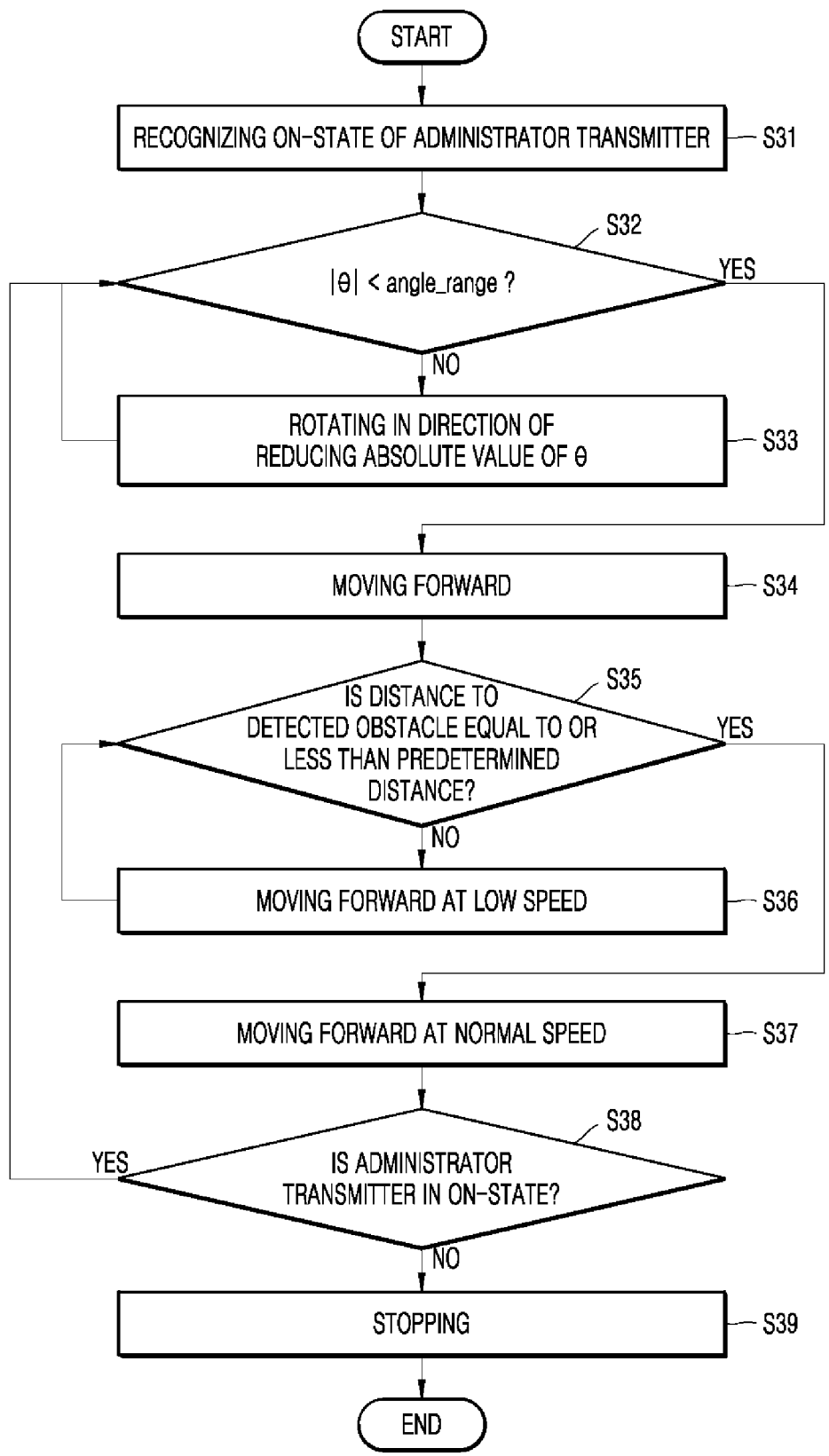
FIG. 6 shows an example process of following, by a robot, a transmitter and aligning according to an embodiment of the present disclosure.
Figure 7:
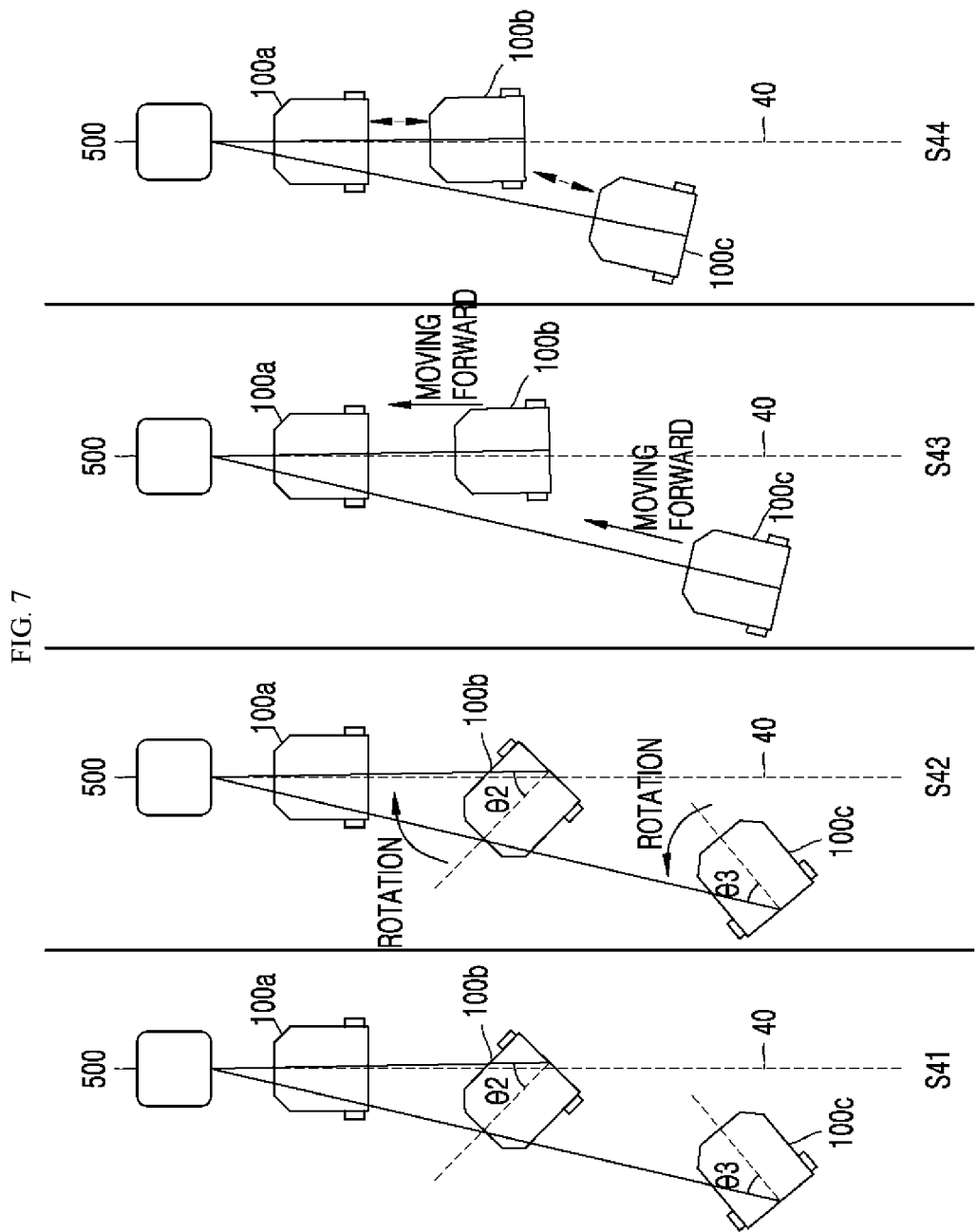
FIG. 7 shows a process of moving a robot toward an administrator transmitter 500 according to an embodiment of the present disclosure.

FIG. 6 shows an example process of aligning robots while following a transmitter. FIG. 7 shows example alignment of a robot with respect to the process in FIG. 6.

When a plurality of robots are arranged, each distance between each robot and an administrator transmitter can be different, and each angle between a centerline of each robot and a virtual line connecting robot and transmitter can be different. Thus, the robot can align itself when starting to track in the administrator mode.

To this end, the robot 100 recognizes the state in which the administrator transmitter 500 is turned on, that is, "on-state" of the transmitter 500 (S31). Then, an angle θ between the transmitter 500 and the centerline of the robot is calculated, and it is determined whether an absolute value of angle θ is included in an angle_range, which is a preset angle range. For example, the angle_range can be 10 degrees.

Based on the absolute value of angle θ being within this range, the robot moves straight toward the transmitter 500. Based on the absolute value of angle θ being out of the angle_range again during straight movement, the robot can rotate in a direction of decreasing angle θ.

In some examples, based on the absolute value of angle θ being out of the angle_range, which a predetermined angle range, the robot rotates in a direction of decreasing the absolute value of angle θ so that the robot follows the transmitter and moves straight (S33).

Subsequently, based on the absolute value of angle θ being included in angle range which is a range of a preset angle at S32, the robot continues to move straight (S34).

During straight moving of the robot, the obstacle sensor 220 or the camera sensor 260 of the robot detects the obstacle disposed around the robot. The controller 250 of the robot determines whether a distance between the detected obstacle and the robot is a predetermined distance or less (S35).

When the detected obstacle is not a robot, but an object or a person, the controller 250 determines based on the above-described Dist_obj at S35.

In some examples, based on the detected obstacle being a robot, the controller 250 determines based on the above-mentioned Dist_robot at S35. In one embodiment, Dist_obj can be set as 90 cm and Dist_robot can be set as 50 cm, that is, the Dist_obj and Dist_robot can be set differently.

Based on the detected distance being equal to or less than a predetermined distance, the robot moves forward at a low speed (S36). By contrast, based on the distance to the obstacle being equal to or more than a predetermined distance, the robot moves forward at a normal speed (S37). At S36 and S37, the robot moves forward toward the transmitter. In this process, the controller 250 determines whether the administrator transmitter maintains an on-state (S38). The robot repeatedly performs S34 to S37 based on the administrator transmitter continually maintaining the on-state.

Based on the administrator transmitter being turned off, the robot stops (S39).

FIG. 7 shows a process of moving robots toward an administrator transmitter 500. A first robot 100a, a second robot 100b, and a third robot 100c are described below.

When the administrator transmitter 500 is turned on, the first robot 100a, the second robot 100b, and the third robot 100c identify a position of the transmitter 500 at respective positions of the robot 100a, the second robot 100b, and the third robot 100c. Reference numeral 40 shows a virtual align line of the transmitter 500.

As shown in S41, a centerline angle of the first robot 100a converges to almost zero. A centerline angle (θ2) of the second robot 100b and a centerline angle (θ3) of the third robot 100c both have a value equal to or greater than a predetermined angle. Therefore, as exemplified in S42, the first robot 100a may not change a direction of the first robot 100a, but each of the second robot 100b and the third robot 100c rotates in a direction of decreasing a size of a centerline angle of each of the second robot 100b and the third robot 100c.

For example, the second robot 100b rotates to the right to reduce the centerline angle (θ2), and the third robot 100c rotates to the left to reduce the centerline angle (θ3). In some examples, the first robot 100a may not move based on determination that the first robot 100a is sufficiently close to the transmitter 500.

As the centerline angle of each of the second robot 100b and the third robot 100c fall within a predetermined range, the second robot 100b and the third robot 100c move straight toward the transmitter 500 as exemplified in S43.

In this process, as exemplified in S44, the second robot 100b and the third robot 100c sense an obstacle (which can include another robot) to maintain a distance from the obstacle, as indicated by dashed arrows.

As shown in FIGS. 6 and 7, the controller 250 controls the robot to face the transmitter by rotating the robot based on a size of the absolute value of the centerline angle between the virtual line connecting the robot and the transmitter 500 and at least one centerline of each of the robots. When external situations change, such as when the robot moves toward the transmitter or when the transmitter 500 moves, or when the robot avoids an obstacle, the robot calculates the centerline angle between the virtual line connecting the robot of the transmitter 500 and at least one center line of at least one of the robots and can change a moving direction of the robot.

Figure 8:
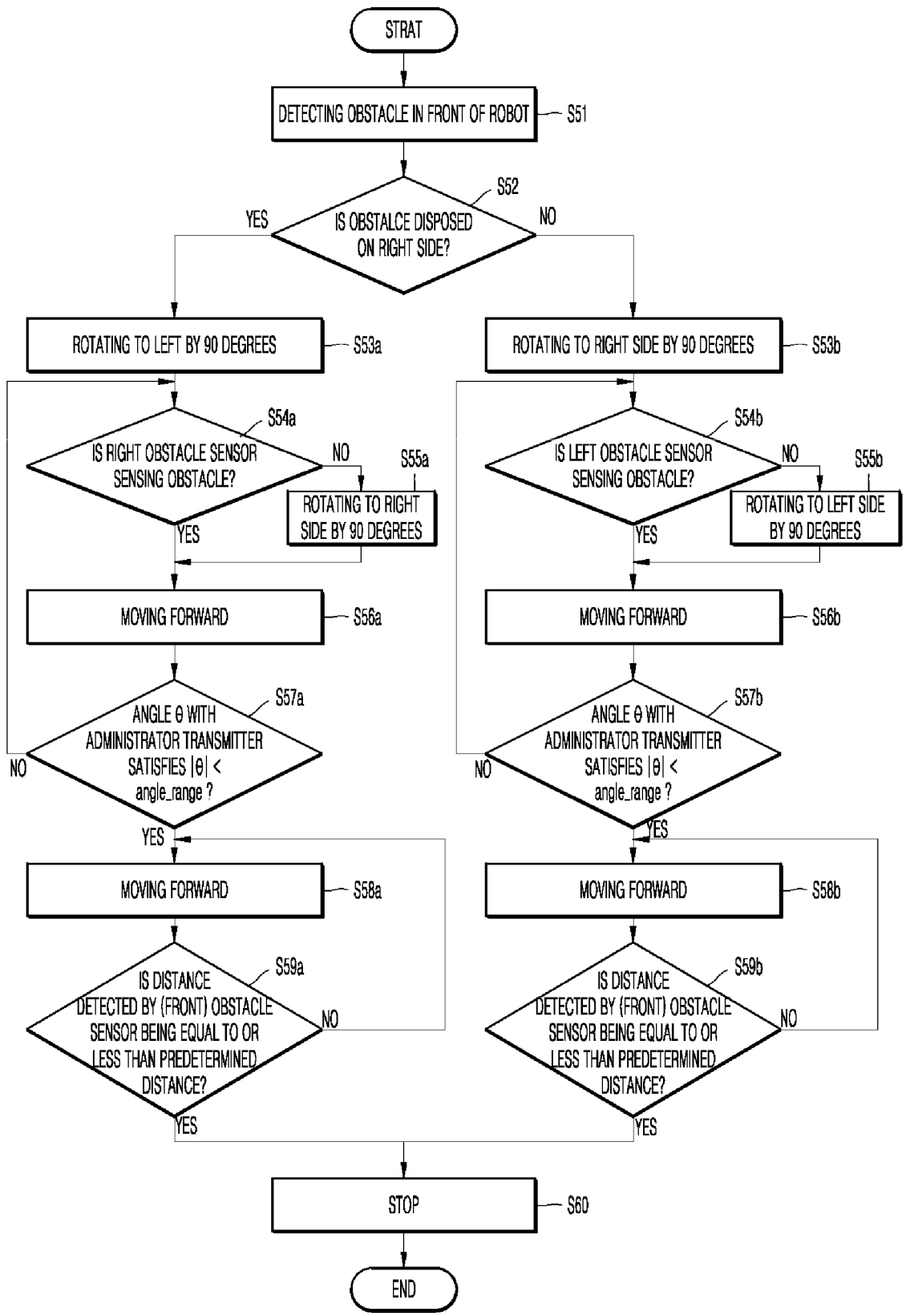
FIG. 8 shows an example process of avoiding obstacles during following, by a robot, of an administrator transmitter according to an embodiment of the present disclosure.

FIG. 8 shows an example process of avoiding, by a robot, obstacles during following of an administrator transmitter. The robot detects an obstacle in front of the robot (S51). A controller 250 can detect an obstacle in front of the robot using a ToF sensor as an example of the above-mentioned obstacle sensor 220 or a depth camera as an example of the camera sensor 260. Any one of flows of S53a to S59a and S53b to S59b can be performed based on determination whether the obstacle is disposed on the right side or the left side.

The situation in which the detected obstacle is disposed on the right is described (S52). As the obstacle is disposed on the right side, the robot 100 rotates 90 degrees to the left (S53a). A rotation angle of the robot can be set differently based on the size of the detected obstacle or distance between the robot and the detected obstacle. That is, the robot can rotate 45 degrees to the left based on the small-sized obstacle or a greater distance between the robot and the obstacle.

After the rotation of the robot, the robot 100 detects an obstacle disposed at a right side based on the rotation at S53a (S54a). When there is no obstacle based on the detection, the obstacle is moved and disappeared during rotation, and thus, the robot 100 again rotates 90 degrees to the right (S55a). When the robot rotates 45 degrees to the left at S53a, the robot 100 can rotate 45 degrees to the right at S55a.

In some examples, when the obstacle is still detected at the right side at S54a, the robot 100 moves forward (S56a) because the obstacle is disposed. The controller 250 controls the positioning sensor 210 to identify the position of the administrator transmitter 500 during forward movement.

The controller 250 determines whether the absolute value of the centerline angle θ belongs to angle_range which is a preset angle range (S57a). Based on the absolute value of the centerline angle θ being within angle_range which is a preset angle range, the robot 100 continually moves forward (S58a).

In this process, when the obstacle sensor 220 or the camera sensor 260 disposed at a front side of the robot detects the obstacle and a distance between the robot and the obstacle is equal to or less than a predetermined distance, the robot 100 can come to a stop (S60). When the distance between the robot and the obstacle is equal to or larger than the predetermined distance, the robot 100 can continually move forward (S58a). The predetermined distance can vary depending on types of the detected obstacles.

The predetermined distance set when the sensed obstacle is an object can be the above-mentioned Dist_obj. The predetermined distance set when the sensed obstacle is a robot can be the above-described Dist_robot. In some examples, the predetermined distance set when the sensed obstacle is a person can be Dist_human.

The controller 250 can set the values corresponding to the predetermined distances to be Dist_human>Dist_obj>Dist_robot. The robot can move at a sufficient distance from a person during moving of the robot 100 and the robot moves with a close distance from an object, which is closer to a distance between the robot and a person, and the robot can move adjacently with peripheral robots so that the robot moves while decreasing a possibility of collision with people or objects.

S53b to S59b are different from S53a to S59a in terms of the left direction/the right direction and description of S53b to S59b is replaced with description of S53a to S59a.

Figure 9:
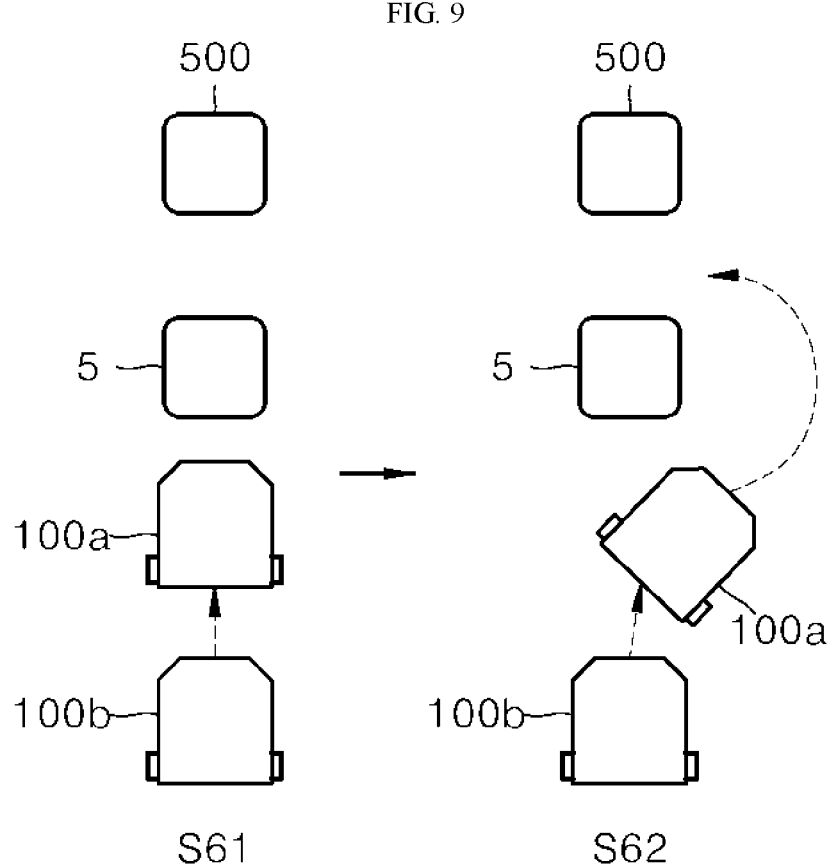
FIG. 9 shows an example robot moving while avoiding obstacles according to an embodiment of the present disclosure.

FIG. 9 shows example moving of a robot while avoiding obstacles. A first robot 100a detects an obstacle 5 at S61. The first robot 100a moves as indicated by dotted arrows while avoiding the obstacle 5 as exemplified in S62. The second robot 100b can determine that the distance between the second robot 100b and the first robot 100a is increased based on the movement of the first robot 100a to move forward.

In the above-described embodiment, a process of detecting an administrator transmitter 500 being turned on when the robot stops, aligning, and then recognizing an obstacle during following is described as follows. During moving of the transmitter 500 by the administrator, the distance between the transmitter 500 and the robot increases, but the distance between the obstacle detected by the obstacle sensor (e.g., the ToF sensor) and the robot is a predetermined distance with no increase in the distance between the obstacle detected by the obstacle sensor (e.g., the ToF sensor) and the robot, the obstacle sensor detects that there is an obstacle rather than the robot in front of the robot.

When driving with following, a new obstacle being disposed in front of the robot or a method of recognizing a situation in which the robot right ahead the robot may not move is described as follows. Based on the distance between the root and the obstacle detected by the obstacle sensor (e.g., the ToF sensor) in front of the robot being not constant and decreased, it is determined that an obstacle is disposed in front of the robot.

The obstacle sensor 220 detects the obstacle 5 disposed along a moving route of each of the transmitter 500 and the robots 100a and 100b. The controller 250 controls the moving speed or the moving direction of the robot so that the robot moves toward the transmitter 500 while avoiding the obstacle 5 based on the distance between the at least one robot of the robots and the obstacle 5.

In some examples, the ToF sensor as an example of the obstacle sensor 220 can measure the distance between the robot and the peripheral obstacle. In this situation, the controller 250 determines that the obstacle is another robot based on the predetermined distance between the robot and the obstacle measure by the obstacle sensor being maintained. The controller may not determine another robot as the obstacle because another robot moves toward the transmitter. As a result, the controller 250 can control the moving speed or the moving direction of the robot.

The above configuration is described in more detail. At S61 of FIG. 9, a distance between a second robot indicated by reference numeral 100b and the first robot indicated by reference numeral 100a is determined to be constant based on continual determination of the distance. Thus, the controller 250 of the second robot 100b may not determine the first robot 100a as a person or an object or a robot in a user following mode.

Instead, the controller 250 of the second robot 100b determines the first robot 100a as a robot moving toward the same transmitter 500. As a result, the second robot 100b may not avoid the first robot 100a and moves toward the transmitter 500 while maintaining a distance between the second robot 100b and the first robot 100a.

The robot can identify another robot using the camera sensor 260, particularly the depth camera sensor. In this situation, the above-described artificial intelligence 255 can determine whether the surrounding object is a robot based on the image photographed by the camera.

Figure 10:
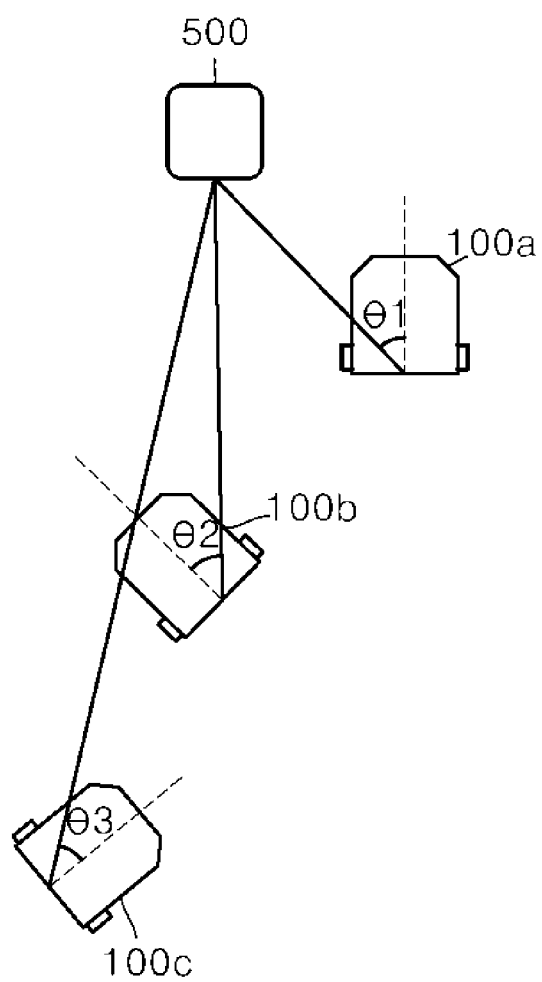
FIG. 10 shows example relation between a distance between a robot and a transmitter and a centerline angle with respect to the transmitter according to an embodiment of the present disclosure.

FIG. 10 shows an example relationship between a distance between each of robots and a transmitter and a centerline angle of each of robots.

A first robot 100a, a second robot 100b, and a third robot 100c are adjacent to the transmitter 500 in that sequence. A centerline angle refers to an angle between a center line of the robot and a virtual line connecting the transmitter 500 and a point of the centerline of a robot. The first robot 100a is sufficiently close to the transmitter 500. Thus, the controller 250 may not rotate when the centerline angle is greater than the preset reference when the distance to the transmitter 500 is less than the preset reference (e.g., a distance of 1 m, 90 cm, and the like).

For example, it is assumed that angle_range is 20 degrees in FIG. 6. In some examples, it is assumed that θ1, which is the centerline angle of the first robot 100a, is 35 degrees. In this situation, centerline angle θ1 is greater than 20 degrees, which is a preset angle. Nevertheless, as the distance between the first robot 100a and the transmitter 500 is close (e.g., the distance between the robot and the transmitter is less than Dist_module), the first robot 100a moves straight without rotating and can follow the transmitter 500.

Similarly, when the second robot 100b also rotates based on the centerline angle (θ2), the second robot 100b can differently set a range in which the second robot 100b stops rotation and moves straight.

When a plurality of robots move in a line while following the transmitter 500, the movement of each of the robots can slow down. Therefore, other robots within a predetermined distance from the robot can have different ranges to determine the centerline angles.

For example, as shown in Table 1, the reference angle (a reference angle) at which the robot rotates toward the transmitter 500 can vary depending on the distance between the robot and the transmitter 500.

TABLE 1

| A distance range with respect to robot | Angle_range |
| --- | --- |
| less than 1 m | equal to or less than 45 degrees |
| 1 m to 2 m | equal to or less than 30 degrees |
| 2 m to 3 m | equal to or less than 20 degrees |
| equal to or greater than 3 m | equal to or less than 10 degrees |

Therefore, the controller 250 compares the centerline angle with a preset reference angle (angle_range) to determine whether the robot rotates, and the reference angle can be reduced based on the distance between the robot 100 and the transmitter 500 as described in embodiments of Table 1.

FIG. 11 shows an example process of determining whether a peripheral object is a robot by photographing, by a camera sensor, peripheral objects.

The camera sensor of a first robot photographs surrounding objects (S64). An artificial intelligence 255 determines whether the photographed object is a second robot (S65). The artificial intelligence is described below.

A controller determines whether a second robot is in an administrator mode based on the determination that the photographed object is the second robot, based on the distance to the second robot and a moving speed of the second robot measured by a depth camera sensor or an obstacle sensor of the first robot (S66) because the robot in a user following mode, in contrast to the administrator mode, moves while following the second transmitter carried by the user rather than a transmitter that follows the first robot.

The controller 250 determines whether the second robot is in the administrator mode based on changes in the distance from the second robot, the moving direction of the second robot, and the like (S67), and when the second robot is in the administrator mode, S68 is performed.

That is, the controller of the first robot maintains the distance from the second robot and moves the first robot toward the transmitter (S68).

In some examples, when the second robot is not in the administrator mode or the peripheral object photographed at S65 is not a robot, the first robot determines the object as an obstacle and performs an operation of avoiding the object (S69).

The above configuration is summarized as follows.

The controller 250 of the first robot determines that the second robot is disposed between the transmitter 500 and the first robot based on the image photographed by the camera sensor 260. The controller 250 of the first robot controls the movement speed and the movement direction of the first robot in response to the movement speed and the movement direction of the second robot.

In this process, the artificial intelligence 255 can distinguish the second robot in the image photographed by the camera sensor in order to improve accuracy thereof. Alternatively, the artificial intelligence 255 distinguishes whether the identified robot is a second robot that moves toward the transmitter or a third robot (in a user following mode) even after the photographed object is identified as a robot. The result of the distinguishment can be generated.

In some examples, the camera sensor 260 can be a depth camera sensor or can further include a depth camera sensor to improve accuracy thereof.

In this situation, the artificial intelligence 255 can receive distance information generated by the depth camera sensor and can determine whether the second robot in the image is a robot that moves toward the transmitter or an obstacle rather than the robot. Alternatively, the controller 250 can determine that the obstacle is a robot that moves toward the transmitter even when the distance to the obstacle sensed by the obstacle sensor 220 is continually constant.

In an embodiment of the present disclosure, the robot 100 determines whether an external obstacle is a robot using the camera sensor 260.

Artificial intelligence is a field of studying artificial intelligence or methodology of implementing artificial intelligence, and machine learning is a field of defining various problems which are handled in the field of artificial intelligence and studying methodology of solving the problems. Machine learning is also defined as an algorithm for enhancing performance of a certain operation through steady experiences thereof.

An artificial neural network (ANN) is a model which is used in machine learning and may refer to all models having problem solubility which include neurons (nodes) forming a network by coupling to synapses. An ANN is defined by a connection pattern between neurons of different layers, a learning process of updating model parameters, and an activation function of generating an output value.

An ANN selectively includes an input layer, an output layer, and one or more hidden layers. Each layer includes one or more neurons, and an ANN includes synapses connecting neurons. In an ANN, each neuron outputs input signals which are input from synapses, a weighting value, and a function value of an activation function with respect to deflection.

A model parameter refers to a parameter which is determined by learning and includes a weighting value for connection by synapses and deflection of neurons. A hyperparameter refers to a parameter which is to be set before learning in a machine learning algorithm and includes a learning rate, a repetition number, a minimum arrangement size, and an initialization function.

The purpose of learning of an ANN is to determine model parameters that minimize a loss function. A loss function can be used as an indicator for determining optimal model parameters in the course of learning an ANN.

Machine learning can be classified into supervised learning, unsupervised learning, and reinforcement learning depending on learning types.

Supervised learning refers to a learning method of causing an ANN to learn in a state in which a label is given to learning data, where a label refers to a correct answer (or a resultant value) which is to be inferred by the ANN when learning data is input to the ANN. Unsupervised learning refers to a learning method of causing an ANN to learn in a state in which a label is not given to learning data. Reinforcement learning refers to a learning method of causing an agent which is defined in a certain environment to learn selection of an action or an action sequence of maximizing cumulative compensation in each state.

Machine learning which is implemented by a deep neural network (DNN) including a plurality of hidden layers is also referred to as deep learning, and deep learning is a part of machine learning. In the following description, machine learning includes deep learning.

The artificial intelligence 255 of the controller 250, e.g., sub-components of the controller 250 of the robot 100 can perform a function for artificial intelligence. The artificial intelligence 255 of the controller 250 can include software or hardware.

In this situation, the communicator 280 of the robot 100 can transmit and receive data to and from a robot that provides another AI function or external devices such as an AI server 700 which is described below with reference to FIG. 12 using wired or wireless communication technology. For example, the communicator 280 can transmit and receive sensor information, a user input, a learning model, a control signal, and the like to and from external devices.

Examples of communication technology which is used by the communicator 280 include global system for mobile communication (GSM), code-division multi access (CDMA), long-term evolution (LTE), 5G, wireless LAN (WLAN), wireless-fidelity (Wi-Fi), Bluetooth™, radio frequency identification (RFID), infrared data association (IrDA), ZigBee, and near-field communication (NFC).

The interface 230 acquires various types of data.

The interface 230 includes a camera that receives an image signal, a microphone that receives an audio signal, and a user input that receives information from a user.

Information acquired by the obstacle sensor 220, the camera sensor 260, or the microphone is referred to as sensing data or sensor information.

The interface 230, various types of sensors 220 and 260, and a wheel encoder of the driver 190 can acquire learning data for model learning, input data which is to be used for acquiring an output using a learning model. These elements can acquire raw input data. In this situation, the controller 250 or the artificial intelligence extracts input features as a pre-process for input data.

The artificial intelligence causes a model constituted by an ANN to learn using learning data. A learned ANN is referred to as a learning model. A learning model can be used to infer a resultant value with respect to new input data instead of learning data, and the inferred value can be used as a basis for determination regarding whether a robot 100 is to perform a certain operation.

The artificial intelligence can perform AI processing along with the learning processor 740 of the AI server 700.

The artificial intelligence 255 includes a memory which is incorporated into the robot 100 or implemented therein. Alternatively, the artificial intelligence 255 can be implemented using an independent memory, an external memory coupled to the robot 100, or a memory which is held in an external device.

The robot 100 acquires at least one of internal information of the robot 100, surrounding environmental information of the robot 100, and user information using various sensors.

Examples of the sensors included in the robot 100 include a proximity sensor, an illuminance sensor, an acceleration sensor, a magnetic sensor, a gyro sensor, an inertia sensor, an RGB sensor, an IR sensor, a fingerprint recognition sensor, an ultrasonic sensor, an optical sensor, a microphone, a LiDAR sensor, an obstacle sensor 220, a camera sensor 260, and a radar.

The interface 230 generates an output associated with a visual sense, an auditory sense, or a haptic sense.

The interface 230 includes a display that outputs visual information, a speaker that outputs auditory information, and a haptic portion that outputs haptic information.

A memory built in the robot 100 store data for supporting various types of functions of the robot 100. For example, the memory can store input data, learning data, learning models, and learning histories which are acquired by various sensors and the interface 230 which are built in the robot 100.

The controller 250 can determine at least one executable operation of the robot 100 based on information which is determined or generated using a data analysis algorithm or a machine learning algorithm. The controller 250 can perform the determined operation by controlling the elements of the robot 100.

For this purpose, the controller 250 can request, retrieve, receive, or utilize data in the artificial intelligence or the memory, and control the elements of the robot 100 such that a predicted operation or an operation determined to be preferable out of one or more executable operations is executed.

When cooperation with an external device is used for executing the determined operation, the controller 250 can generate a control signal for controlling the external device and transmit the generated control signal to the external device.

The controller 250 can acquire intention information from a user input and determine requirements of the user based on the acquired intention information.

The controller 250 can acquire intention information corresponding to a user input using at least one or more of a speech-to-text (STT) engine for converting a speech input into text and a natural language process (NLP) engine for acquiring intention information in a natural language.

At least one of the STT engine and the NLP engine can be constituted by an ANN in accordance with a machine learning algorithm. At least one of the STT engine and the NLP engine can be an engine which has learned by the artificial intelligence, an engine which has learned by the learning process 740 of the AI server 700, or an engine which has learned by distributed processes thereof.

The controller 250 can collect history information including operation details of the robot 100 or feedback of a user which is used for the operation and store the collected history information in the memory or the artificial intelligence or transmit the collected history information to an external device such as the AI server 700. The collected history information can be used to update a learning model.

The controller 250 can control at least a part of the elements of the robot 100 in order to drive an application program stored in the memory 170. In addition, the controller 250 can allow two or more of the elements of the robot 100 to operate in combination in order to drive an application program.

Alternatively, an independent artificial intelligence server (an AI server) communicating with the robot 100 can be provided and process information which is provided by the robot 100.

FIG. 12 illustrates an example configuration of an AI server.

FIG. 12 illustrates a configuration of an AI server according to an embodiment of the invention.

An artificial intelligence server, that is, an AI server 700, refers to a device that causes an ANN to learn using a machine learning algorithm or uses a learned ANN. The AI server 700 can include a plurality of servers and perform distributed processes and can be defined as a 5G network. The AI server 700 is provided as a portion of an AI device 100 and perform at least a part of AI processing together.

The AI server 700 includes a communicator 710, a memory 730, a learning processor 740, and a processor 760.

The communicator 710 transmits and receives data to and from an external device such as the robot 100.

The memory 730 includes a model storage 731. The model storage 731 stores a model which is learning or learned (or an artificial neural network 731*a*) via the learning processor 740.

The learning processor 740 causes the artificial neural network 731*a* to learn using learning data. A learning model can be used in a state in which it is mounted in the AI server 700 of an ANN or can be used in a state in which it is mounted in an external device such as the robot 100.

A learning model can be implemented in hardware, in software, or in a combination of hardware and software. When a part or the whole of a learning model is implemented in software, one or more instructions constituting the learning model can be stored in the memory 730.

The processor 760 infers a resultant value for new input data using a learning model and a response or a control command based on the inferred value.

In particular, in the present disclosure, the artificial intelligence 255 or the AI server 700 can output information on whether an object disposed around the robot is a robot in an input image. For example, when an image of a nearby object is input to the AI 255 or the AI server 700, the AI 255 and the AI server 700 analyze the image to determine whether the photographed object is a robot or an object, or more particularly, a moving person rather than the object and to output.

In some examples, when the photographed object is a robot, the artificial intelligence 255 can determine whether the corresponding robot is a robot that moves while following a user or a robot that follows an administrator transmitter in the administrator mode. The depth camera sensor calculates the distance between the robot and the peripheral robot to determine whether each of the artificial intelligence 255 or the controller 250 is in the administrator mode based on the predetermined distance between the robot and the peripheral robot.

This determination process has been described in FIG. 11.

According to the present disclosure, when the artificial intelligence 255 is mounted on the robot, it is possible to improve accuracy in determination of another robot in the administrator mode.

That is, an AI technology can be used for the robot 100, and the robot 100 can include a guide robot, a transport robot, a cleaning robot, a wearable robot, an entertainment robot, a pet robot, an unmanned flying robot, and the like.

The robot 100 can include a robot controller that controls operation, and the robot controller can refer to software or a chip implemented as hardware.

The robot 100 obtains state information related to the robot 100a based on sensor information obtained from various types of sensors or detects (or recognizes) the surrounding environment and an object or generates map data, or determines a moving route and travel plans of the robot, or determines response to user interaction, or determines operation of the robot.

The robot 100 can use sensor information acquired from at least one sensor among a LiDAR, a radar, and a camera to determine a movement route and travel plans of the robot 100.

The robot 100 can perform the above operations using a learning model including at least one ANN. For example, the robot 100a can recognize a surrounding environment and an object using a learning model and can determine operation of the robot 100a based on the recognized surrounding environment information or object information. The learning model can be directly learned by the robot 100a or can be learned by an external device such as the AI server 700.

In this situation, the robot 100 can perform operation of the robot 100 by generating a result using a direct learning model and can also perform the operation of the robot 100 by transmitting sensor information to the external device such as the AI server 700 and receiving the generated result thereof.

The robot 100 determines a moving route and travel plans of the robot 100 based on at least one of map data, object information detected from sensor information, or object information obtained from an external device, and controls the driver to determine the moving route and the travel plans of the robot 100 to travel the robot 100.

The map data can include object identification information on various types of objects disposed in the space where the robot 100 moves. For example, the map data can include object identification information related to fixed objects such as walls and doors and movable objects such as flower pots and desks. The object identification information can include a name, a type, a distance, a position, and the like.

In some examples, the robot 100 can control the driver based on the control/interaction of the user, to thereby perform operation or travelling of the robot 100. In this situation, the robot 100 can obtain intention information related to the interaction determined based on the user's operation or voice utterance, and determine the response based on the obtained intention information to perform the operation of the robot 100.

In some examples, the robot 100 performs autonomous driving, and in this process, the AI technology is applied, and can include a mobile robot, a vehicle, an unmanned flight vehicle, and the like.

The autonomous robot 100 can include an autonomous driving control portion that controls a function for the autonomous driving, and the autonomous control portion can refer to software or a chip implemented as hardware. The autonomous driving controller can be included in the robot 100 as a component of the autonomous robot 100 and the autonomous driving controller is provided as additional hardware outside of the robot 100 to be connected thereto.

The autonomous robot 100 can obtain state information related to the autonomous robot 100 based on sensor information obtained from various types of sensor or can detect (or recognize) the surrounding environment and an object or can generate map data or can determine a travel route and travel plans of the robot 100, or can determine operation of the robot 100.

The autonomous robot 100 can use sensor information obtained from at least one sensor among a LiDAR, a radar, and a camera, similar to the robot 100, in order to determine the movement route and travel plans of the robot 100.

In particular, the autonomous robot 100 can recognize the environment with respect to or the objects disposed in invisible areas or areas having a predetermined distance or more by receiving the sensor information from the external devices or can receive information directly recognized by the external devices.

The autonomous robot 100 can perform the above operations using a learning model including at least one ANN. For example, the autonomous robot 100 can recognize a surrounding environment and an object using a learning model and can determine a driving line of the robot based on the recognized surrounding environment information or object information. The learning model can be learned directly by the autonomous vehicle 100b or can be learned by an external device such as the AI server 700.

In this situation, the autonomous robot 100 can perform operation by generating a result using a direct learning model and can also transmit sensor information to an external device such as an AI server 700 and can receive the generated result to perform the operation of the robot 100.

The autonomous robot 100 determines a movement route and travel plans of the autonomous robot 100 based on at least one of map data, object information detected from sensor information, or object information obtained from an external device, and controls the driver to travel the autonomous travelling robot 100 along the determined movement route and according to travelling plans of the robot 100.

The map data can include object identification information related to various types of objects disposed in a space (e.g., a road) where the autonomous vehicle 100b travels. For example, the map data can include object identification information related to fixed objects such as street lights, rocks, buildings, and movable objects such as vehicles and pedestrians. The object identification information can include a name, type, a distance, a location, and the like.

In some examples, the autonomous robot 100 can control the driver based on control/interaction of the user to perform operation of the robot 100 or travel. In this situation, the autonomous robot 100 can obtain the intention information related to the interaction based on operation of the user or voice utterance, and determine the response based on the obtained intention information to perform the operation thereof.

In some examples, the robot 100 can use the AI technology and autonomous driving technology, and can include guide robots, transport robots, cleaning robots, wearable robots, entertainment robots, pet robots, unmanned flying robots, and the like.

The robot 100 that performs a function for autonomous driving can be collectively referred to as a device that moves along a given moving line of the robot 100 without control of the user or moves by determining the moving line of the robot 100 by itself.

The robot 100 that performs a function for autonomous driving can use a common sensing method to determine at least one of a moving route or travelling plans of the robot 100. For example, the robot 100 that performs the autonomous driving function can determine at least one moving route or travelling plans of the robot 100 based on the information sensed by a LiDAR, a radar, and a camera.

Although components included in an example embodiment of the present disclosure are described as being combined to one, or as being coupled to operate, such an embodiment is not necessarily limited to this specific example, and these components can be selectively combined to one or more and coupled to operate within the purpose range of the present disclosure. Further, although all of the components can be implemented as an independent hardware, a part or all of each of the components can be selectively combined and implemented as a computer program that has a program module to perform a part or all of the functions combined in one or a lot of hardware. Codes and code segments that are included in the computer program may be easily deduced by those skilled in the art of the present disclosure. The computer program can be stored in computer readable media that a computer can read, and may be read and implemented by the computer, to implement the present disclosure. The storage medium of the computer program can include a storage medium including a semiconductor recording element, an optical recording medium, a magnetic recording medium. Further, the computer program that implements the embodiment of the present disclosure can include a program that is transmitted in real time through an external apparatus.

While the present disclosure has been mainly described referring to the example embodiments of the present disclosure hereinabove, various modifications and changes can be made at the level of those skilled in the art. Therefore, unless such modifications and changes do not deviate from the range of the present disclosure, it will understand that they are included in the scope of the present disclosure.

Other embodiments are within the scope of the following claims.

What is claimed is:

1. A robot for moving in an administrator mode, the robot comprising:
   a positioning sensor configured to sense an administrator transmitter and calculate a position of the administrator transmitter;
   an obstacle sensor configured to sense an obstacle around the robot;
   a driver configured to move the robot; and
   a controller configured to:
      in response to receiving a signal from the administrator transmitter, align the robot toward the position of the administrator transmitter,
      move the robot toward the administrator transmitter while avoiding one or more obstacles sensed by the obstacle sensor, and
      in response to no longer receiving the signal from the administrator transmitter or a distance between the administrator transmitter and the robot being equal to or less than a preset distance, stop the robot,
   wherein the administrator mode is a mode in which two or more robots move while following the administrator transmitter,
   wherein the robot enters in the administrator mode when the robot receives an external control signal or when the robot completes a pre-programmed operation, and
   wherein the controller is further configured to:
      control the robot to face the administrator transmitter by rotating the robot based on an absolute value of a centerline angle between a centerline of the robot and the position of the administrator transmitter,
      control the robot to move straight toward the administrator transmitter if the absolute value of the centerline angle is within a preset reference angle, and
      switch a mode of the robot into the administrator mode and control the robot to move while following the administrator transmitter based on the signal received from the administrator transmitter when a second signal is not detected from a user carrying transmitter instructing a user following mode, or
      switch to the mode of the robot into the administrator mode when the user carrying transmitter is disposed inside of the robot.

2. The robot for moving in the administrator mode of claim 1, wherein the controller is further configured to:
   determine when the robot rotates by comparing the centerline angle with the preset reference angle,
   wherein the preset reference angle is reduced as the distance between the robot and the administrator transmitter becomes larger.

3. The robot for moving in the administrator mode of claim 1, wherein the obstacle sensor is further configured to detect whether the obstacle is disposed between the administrator transmitter and a movement route of the robot, and
   wherein the controller is further configured to control a moving speed or a moving direction of the robot to move the robot toward the administrator transmitter while avoiding the obstacle based on a distance between the robot and the obstacle.

4. The robot for moving in the administrator mode of claim 3, wherein the obstacle sensor is further configured to measure the distance from the robot to the obstacle, and
   wherein the controller is further configured to:
      when the distance from the robot to the obstacle is constantly maintained, determine that the obstacle is a second robot and control the moving speed or the moving direction of the robot to maintain a distance between the robot and the second robot.

5. The robot for moving in the administrator mode of claim 1, further comprising:
   a camera sensor configured to photograph an object around the robot,
   wherein the controller is further configured to:
      determine a second robot is disposed between the administrator transmitter and the robot based on an image photographed by the camera sensor, and
      control a moving speed or a moving direction of the robot based on a moving speed or a moving direction of the second robot.

6. The robot for moving in the administrator mode of claim 5, further comprising:
an artificial intelligence processor configured to:
determine whether the second robot is in the image photographed by the camera sensor, and
generate a result based on distinguishing the second robot that moves toward the administrator transmitter from a third robot that does not move toward the administrator transmitter in the image photographed by the camera sensor.

7. The robot for moving in the administrator mode of claim 6, wherein the camera sensor further comprises a depth camera sensor, and
wherein the artificial intelligence processor is further configured to:
receive distance information generated by the depth camera sensor and determine whether the second robot in the image is moving toward the administrator transmitter based on the distance information.

8. The robot for moving in the administrator mode of claim 1, wherein the controller is further configured to:
determine that the user carrying transmitter is disposed inside of the robot based on a size of the robot, a calculated position of the positioning sensor in the robot, and a calculated position of the user carrying transmitter.

9. A method for moving a robot in an administrator mode, the method comprising:
sensing an administrator transmitter and calculating a position of the administrator transmitter by a positioning sensor of the robot;
aligning, by a controller of the robot, the robot toward the administrator transmitter based on a signal received from the administrator transmitter;
sensing, by an obstacle sensor of the robot, an obstacle around the robot;
moving, by the controller, the robot toward the administrator transmitter while avoiding the obstacle sensed by the obstacle sensor; and
in response to no longer receiving the signal from the administrator transmitter or a distance between the administrator transmitter and the robot being equal to or less than a preset distance, stopping the robot,
wherein the administrator mode is a mode in which two or more robots move while following the administrator transmitter,
wherein the robot enters in the administrator mode when the robot receives an external control signal or when the robot completes a pre-programmed operation, and
wherein the method further comprises:
controlling the robot to face the administrator transmitter by rotating the robot based on an absolute value of a centerline angle between a centerline of the robot and the position of the administrator transmitter;
controlling the robot to move straight toward the administrator transmitter if the absolute value of the centerline angle is within a preset reference angle; and
switching, by the controller, a mode of the robot into the administrator mode and controlling the robot to move while following the administrator transmitter based on the signal received from the administrator transmitter when a second signal is not detected from a user carrying transmitter instructing a user following mode, or switching, by the controller, the mode of the robot into the administrator mode when the user carrying transmitter is disposed inside of the robot.

10. The method for moving the robot in the administrator mode of claim 9, further comprising:
determining, by the controller, whether the robot is rotated by comparing the centerline angle with the preset reference angle,
wherein the preset reference angle is reduced as the distance between the robot and the administrator transmitter becomes larger.

11. The method for moving the robot in the administrator mode of claim 9, further comprising:
detecting, by the obstacle sensor, an obstacle disposed between the administrator transmitter and a moving route of the robot; and
controlling, by the controller, a moving speed or a moving direction of the robot to move the robot toward the administrator transmitter while avoiding the obstacle based on a distance between the robot and the obstacle.

12. The method for moving the robot in the administrator mode of claim 11, further comprising:
measuring, by the obstacle sensor, the distance between the robot and the obstacle; and
when the distance from the robot to the obstacle is constantly maintained, determining the obstacle as a second robot and controlling the moving speed or the moving direction of the robot to maintain a distance between the robot and the second robot.

13. The method for moving the robot in the administrator mode of claim 9, further comprising:
photographing, by a camera sensor of the robot, an object around the robot;
determining, by the controller, that a second robot is disposed between the administrator transmitter and the robot based on an image photographed by the camera sensor; and
controlling, by the controller, a moving speed and a moving direction of the robot based on a moving speed or a moving direction of the second robot.

14. The method for moving the robot in the administrator mode of claim 13, further comprising:
determining, by an artificial intelligence processor in the robot, whether the second robot is in the image photographed by the camera sensor; and
generating, by the artificial intelligence processor, a result based on distinguishing the second robot that moves toward the administrator transmitter from a third robot that does not move toward the administrator transmitter in the image photographed by the camera sensor.

15. The method for moving the robot in the administrator mode of claim 14, further comprising:
receiving, by the artificial intelligence processor, distance information generated by a depth camera sensor included in the camera sensor; and
determining, by the artificial intelligence processor, whether the second robot is moving toward the administrator transmitter based on the distance information.

16. The method for moving the robot in the administrator mode of claim 9, further comprising:
determining, by the controller, that the user carrying transmitter is disposed inside of the robot based on a size of the robot, a calculated position of the positioning sensor in the robot, and a calculated position of the user carrying transmitter.

\* \* \* \* \*